(12) United States Patent
Preisach

(10) Patent No.: US 7,440,512 B2
(45) Date of Patent: Oct. 21, 2008

(54) ELECTRICAL SIGNAL REGENERATOR

(75) Inventor: Helmut Preisach, Besigheim (DE)

(73) Assignee: ALCATEL, Paris (FR)

( * ) Notice: Subject to any disclaimer, the term of this patent is extended or adjusted under 35 U.S.C. 154(b) by 712 days.

(21) Appl. No.: 10/753,327

(22) Filed: Jan. 9, 2004

(65) Prior Publication Data

US 2004/0151173 A1    Aug. 5, 2004

(30) Foreign Application Priority Data

Feb. 5, 2003    (EP)    ................... 03360016

(51) Int. Cl.
*H04L 27/00*    (2006.01)

(52) U.S. Cl. ................. 375/295; 375/232; 375/233; 375/234; 398/55; 398/155; 398/175

(58) Field of Classification Search ................ 375/222, 375/232, 318, 230, 233, 236, 354; 361/733; 370/249, 389, 441, 463, 466, 506, 517, 358, 370/505; 398/201, 79, 195
See application file for complete search history.

(56) References Cited

U.S. PATENT DOCUMENTS

| | | | | |
|---|---|---|---|---|
| 4,019,048 A | * | 4/1977 | Maione et al. | ............... 398/155 |
| 5,278,404 A | * | 1/1994 | Yeates | ..................... 250/214 C |
| 5,293,260 A | | 3/1994 | Kikawa et al. | |
| 5,323,423 A | * | 6/1994 | Townsend et al. | ........... 375/232 |
| 5,504,778 A | * | 4/1996 | Carriere | ...................... 375/222 |
| 5,524,109 A | * | 6/1996 | Smith et al. | .................. 370/517 |
| 5,552,962 A | * | 9/1996 | Feustel et al. | ................ 361/733 |
| 5,991,270 A | * | 11/1999 | Zwan et al. | .................. 370/249 |
| 6,067,180 A | * | 5/2000 | Roberts | ....................... 398/201 |
| 6,233,077 B1 | * | 5/2001 | Alexander et al. | ............ 398/79 |
| 2002/0121397 A1 | | 9/2002 | Saarinen | |
| 2003/0002498 A1 | * | 1/2003 | Boulais et al. | .............. 370/389 |

* cited by examiner

*Primary Examiner*—David C. Payne
*Assistant Examiner*—Adolf Dsouza
(74) *Attorney, Agent, or Firm*—Sughrue Mion, PLLC

(57) ABSTRACT

An electrical signal regenerator including an equalizer and a clock data recovery circuit is provided. The clock data recovery circuit is selected when an input signal of a higher bitrate multiplex level is detected, but the clock data recovery circuit is bypassed when an input signal of a lower bitrate multiplex signal is detected. The electrical signal regenerator can be used in an optical switch processing signals of the new OTN according to ITU-T G.709, in which optical signals undergo optical to electrical conversion and are fed to an electrical space switching matrix including a plurality of the switch modules electrically interconnected by means of internal electrical signal paths such as a backplane or electrical cables. The electrical signal regenerator can be coupled to each input of a switching module to check internal cabling of the switching matrix.

15 Claims, 4 Drawing Sheets

ELECTRICAL SIGNAL REGENERATOR

The invention is based on a priority application EP 03360016.4 which is hereby incorporated by reference.

FIELD OF THE INVENTION

The present invention relates to the field of telecommunications and more particularly to an electrical signal regenerator for high bitrate applications for use in transmission equipment.

BACKGROUND OF THE INVENTION

While today's telecommunication transmission networks mainly rely on optical transmission, internal signal processing in the network elements of a transmission network is still electrical in most cases.

The recent definition of the multiplexing principles and bitrates of an Optical Transport Network (ITU-T G.709) introduces a three level hierarchy with bitrates of 2.7 Gbit/s, 10.7 Gbit/s and 43 Gbit/s. Therefore, equipment is required for electrically processing these high bitrate signals. In particular, one issue in question is the internal signal distribution over backplanes and electrical cables which may distort internal electrical signals.

It is therefore an object of the present invention, to provide an electrical signal regenerator for high bitrate electrical signals suitable to be used in network elements of an optical transmission network. Another object of the present invention is to provide a method of internally distributing high bitrate electrical signals. Yet another object of the present invention is to provide a network element for electrically processing the multiplex levels of the recently defined Optical Transmission Network (OTN) according to ITU-T G.709.

SUMMARY OF THE INVENTION

These and other objects that appear below are achieved by an electrical signal regenerator with an equalizer and a clock data recovery circuit, whereby the latter is selected for output when an input signal of a higher bitrate multiplex level is detected and bypassed when an input signal of a lower bitrate multiplex signal is detected.

Regarding the network element, the present invention proposes a bitrate-transparent asynchronous switch for signals of the new OTN. In particular, received optical signals undergo O/E conversion and are fed to an asynchronous space switching matrix operable to randomly switch signals from any to any port of the crossconnect. The switching matrix contains a number of switch modules electrically interconnected by means of internal electrical signal paths such as a backplane or electrical cables. An electrical signal regenerator is coupled to each input of a switching module. Each signal regenerator contains an equalizer and a clock data recovery circuit, whereby the latter is selected for output only when it detects an input signal of a higher bitrate multiplex level and bypassed otherwise.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
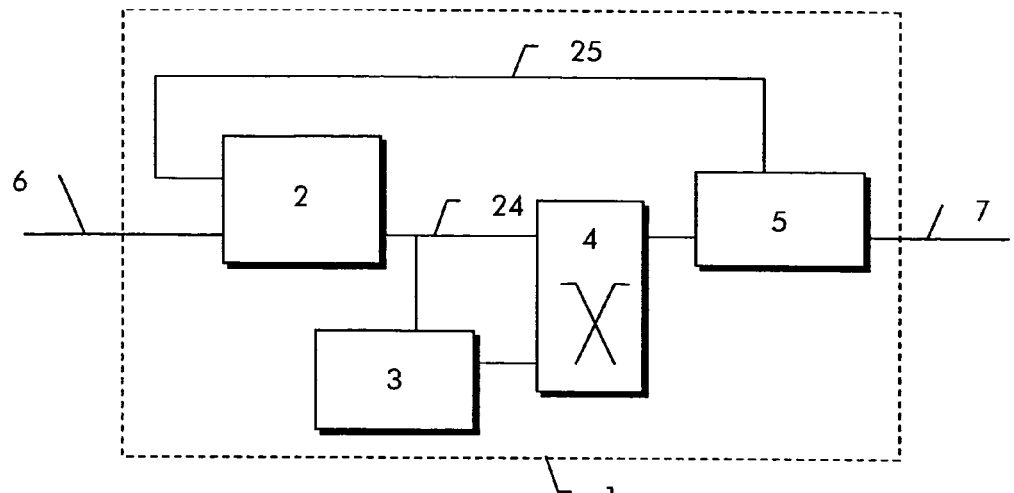
FIG. 1 shows a bock diagram of the electrical signal regenerator.

The electrical signal regenerator 1 shown in FIG. 1 contains an equalizer 2, a clock data recovery circuit 3 (CDR in the following) coupled to the output of the equalizer, a switch 4 for selecting either the output of the CDR circuit or via a bypass 24 the output of the equalizer. The selected signal from switch 4 is then fed to a decision circuit 5, i.e., a comparator which decides upon logical signal value 0 or 1 to produce output signal 7. Additionally, the signal regenerator has a loop back line 25 for test purposes.

A basic idea of the present invention is to adapt the operation of the signal regenerator to the bitrate of the received signal. The invention recognizes that for an electrical input signal 6 operating at 2.7 Gbit/s, i.e., the lowest OTN bitrate, electrical equalization is sufficient, while for approximately 10 Gbit/s, additional CDR is necessary to improve the jitter properties of the signal regenerator. Therefore, the CDR circuit 3 contains a frequency meter which measures the frequency of the input signal 6 and controls the switch 4 to select either the output of the CDR circuit 3 or the output of the equalizer as output signal 7. The frequency meter is advantageously realized with an external quartz oscillator and a counter which counts the number of pulses of the recovered clock signal of the input signal per measurement cycle defined by the external oscillator.

It shall be noted that signals of the third OTN level, i.e., at 43 Gbit/s will not be discussed in the following as a bitrate of that level would encompass additional system limitations that shall not be discussed here and is not an object of the present invention. Typically, if 43 Gbit/s signals shall be processed electrically, one would choose a parallel format, e.g., converting the 43 Gbit/s into 4×10.75 Gbit/s and process the 4 signals in parallel.

Figure 2:
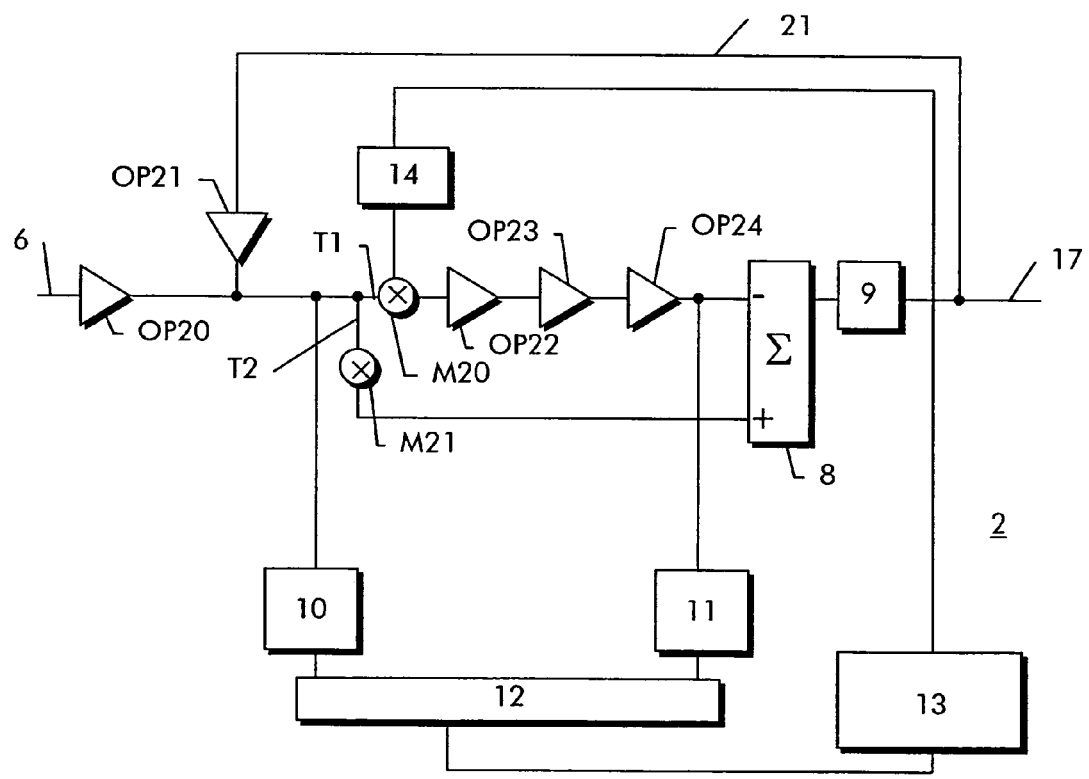
FIG. 2 shows the equalizer of the signal regenerator from FIG. 1 in more detail.

The equalizer is shown in more detail in FIG. 2. Input signal 6 is first amplified by amplifier OP20. The amplified signal is fed to two taps T1, T2. Each tap contains a multiplier M20, M21, however, multiplier M21 in tap T1 is fixed to value 1 in this example. Multiplier M20 can be adjusted via control loop 14. Tap 1 is a delay line which contains three cascaded amplifiers OP22, OP23, and OP24 and has a delay in the range of about 100 ps. In the embodiment shown, the delay line has a delay of 94 ps. The amplifiers are simple differential buffer amplifiers, i.e., feedback-controlled current amplifier with a broadband frequency spectrum of up to 12 GHz and a delay of approximately 30 ps, each. The total amplification of the three amplifiers of the delay line is adjusted to the value 1.

Both taps are connected to an adder-subtractor 8. Tap T1 is connected to the inverted input and top T2 to the non-inverted input of the adder-subtractor 8, so that the signal from tap T2 is subtracted from the signal from tap T1. The output of the adder-subtractor is fed to a limiter 9 at the signal output of the equalizer. The limiter 9 is a limiting amplifier which serves to adjust the total amplification of the equalizer to be greater than 1. Output 17 of the equalizer is fed to CDR circuit 3 in FIG. 1 and via bypass 24 to switch 4.

Peak detectors 10 and 11 measure the maximum pulse amplitude before and after the delay line of tap T1. The peak values are subject to A/D conversion by A/D-converter 12 and the digital values then evaluated by logic circuit 13 in order to determine a control signal to tune multiplier M20.

In addition, the output of the equalizer can be fed back to the input for test purposes via test loop 21 and amplifier OP21.

The equalizer is optimized to compensate cable distortion of coax cables or backplanes that have a relatively smooth frequency response with low-pass characteristic, which is typically the case as long as there are no signal reflections. The frequency response of the equalizer is approximately a sinus curve, whereby the maximum value is controlled by multiplier M20 in tap T1 and the width of the curve depends on the delay value of tap T1. For 10 Gbit/s applications, the frequency response of the equalizer has its maximum at 5 GHz, i.e., approximately half the bitrate of interest because 5 GHz is the fundamental frequency of a signal operating at 10 Gbit/s. The frequency response of a coax cable for example, has typically a "sqrt(f)" shape, which can be approximated relatively well by the rising edge of the sinus shape. In other words, the rising edge of the sinus shaped frequency response curve of the equalizer is used to compensate the cable distortion for signals up to approximately 10 Gbit/s.

Figure 3:
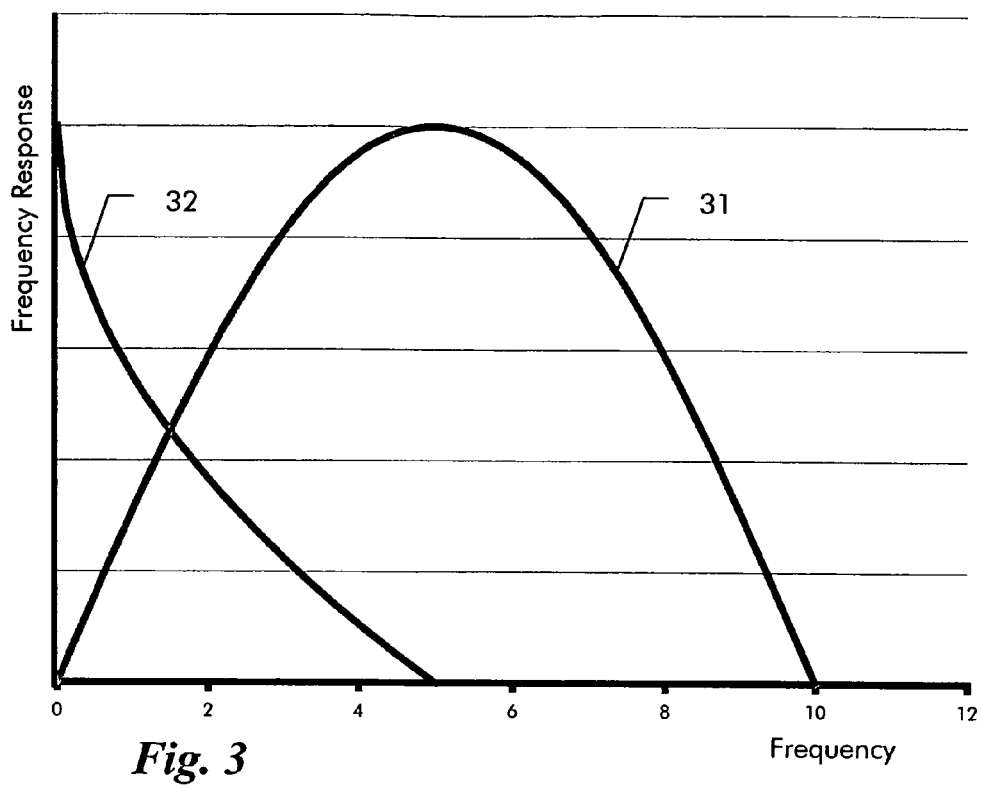
FIG. 3 shows the frequency response of the equalizer and a typical frequency characteristic of a coax cable.

The normalized frequency response curve of the equalizer is shown schematically in FIG. 3, denoted with reference sign 31. Curve 32 is the typical frequency response curve of a coax cable. It can be observed that the rising edge of the sinus-shaped equalizer curve approximates adequately the distortion of the coax cable.

Via multiplier M20, the ratio between and input and output of tap T1 is adjusted. This ratio depends on temperature and other external conditions. The control loop in tap T1 can thus be used to adapt the equalizer dynamically to changing conditions. However, it may also be sufficient to adjust tap T1 only once when switching the equalizer on and let the initial ratio fixed afterwards.

During start of the equalizer, a static signal is fed via test loop 21 to the input of the equalizer and amplifier OP20 turned off (i.e., no external input signal). Peak detector 10 measures the static test input and peak detector 11 measures the output of tap T1. The peak detectors are realized with a capacitor that is charged with the input signal until its voltage reaches the maximum signal amplitude after approximately 0.5 µs. This peak measurement is cyclical, i.e., after a measurement cycle of about 2 µs, the voltage at the capacitor is reset to zero to start a new measurement cycle. Cyclical measurement is necessary to enable detection of a loss of the input signal, because if the peak detectors will not be reset, they would hold the maximum value, once fully charged, forever even when the input signal has long disappeared.

The results from the two peak detectors are fed via A/D-converter 12 to logic circuit 13, which is implemented with logic gates but could alternatively also be implemented with a processor and corresponding control software. The logic circuit 13 is a state machine that considers input and output peak values and determines according to a predefined optimization routine a scheduled value for the ratio. In the preferred embodiment, the scheduled ratio is 0.3. When the equalizer is switched on, the logic circuit 13 adjusts the ratio between input and output of tap T1 in 10 steps. Afterwards, it may be disabled. Alternatively, it can continue to adjust the ratio to changing temperature conditions in an on-line tracking process. This may be advantageous, if the cooling of the entire signal regenerator is insufficient and therefore temperature will change during operation.

Peak detector 10 has thus two functions. On the one hand, it detects loss of input signal and raises via logic circuit 13 a corresponding alarm and on the other hand, it serves to measure and adjust the ratio between input and output of tap T1.

Figure 4A:
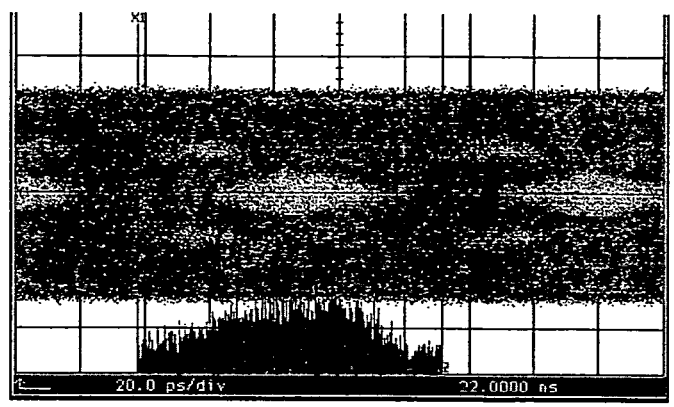
FIGS. 4a to 4c show signal measurements in front of and after passing the equalizer and after passing the clock data recovery circuit.
Figure 4B:
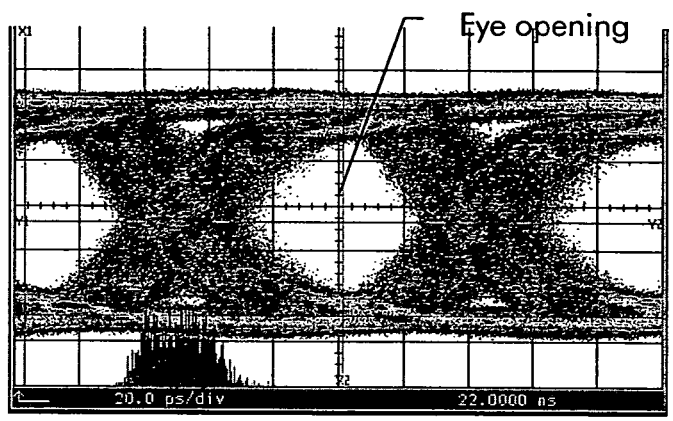
Figure 4C:
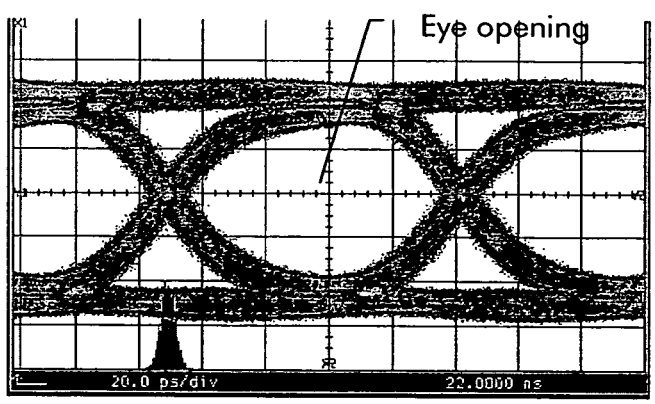

The equalizer 2 can compensate distortion of about 12 to 14 m coax cable or alternatively of about 1.7 to 1.8 m backplane. FIGS. 4a and 4b show signal measurements of a 10 Gbit/s signal after 104 cm backplane plus 3 m coax cable. Such measurements are typically referred to as eye diagrams. FIG. 4a is an eye diagram of the distorted input signal. It can be observed that the eye is completely closed. FIG. 4b shows the eye diagram after equalization. It can be observed that the eye has been widely opened by the equalizer. It can also be observed, however, that the poorly defined crossing area and the relatively soft rising edge would lead to jitter in the regenerated signal. Therefore, at 10 Gbit/s, additional CDR is required. FIG. 4c shows the eye diagram after CDR. The signal is now perfectly re-shaped and does not show any jitter anymore.

Figure 5:
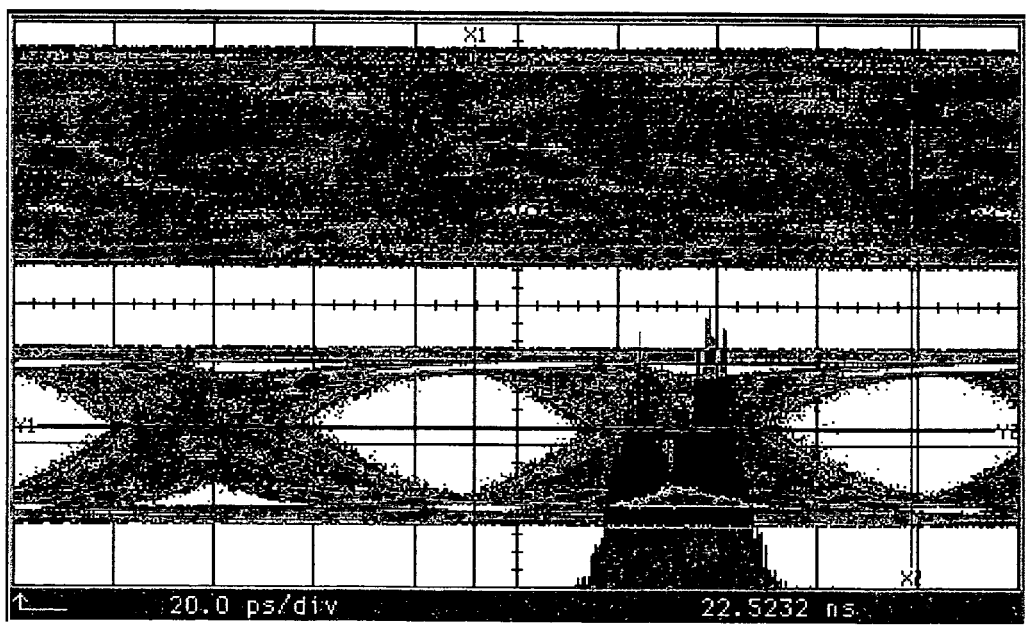
FIG. 5 signal measurement of an optical signal fed to the signal regenerator

The signal regenerator according to the present invention is adapted to compensate electrical cable distortion but can, however, also be used to compensate distortion of an optical signal due to dispersion effects. FIG. 5 shows the eye diagram of an optical signal after 1 km standard multi-mode fiber at the output from an optical receiver, i.e., directly after O/E conversion. No optical dispersion compensation has been applied. The eye diagram before equalization, i.e., the output signal from the optical receiver, has been nearly closed (upper part of the figure) and the equalizer perfectly opens the eye (lower part of the figure).

The test loop via OP21 described above can advantageously also be used for testing the equalizer during manufacturing on the wafer or after packaging. As the entire equalizer circuit is an analog circuit without any logical components such as flip-flops in the signal path, looping back the inverted output to the input creates a ring oscillator. In particular, a first ring oscillator leads via tap T1 and a second ring oscillator leads via tap T2. Each ring oscillator oscillates at a different frequency. The difference of the two frequencies from these two paths gives an exact measure for the delay of the first tap T1. This can be used as a criterion to sort the chips during manufacturing, because the delay determines the maximum value frequency in the frequency response curve shown in FIG. 3. The tolerance for this frequency value is +/−15%. Therefore, chips that have a deviation from the scheduled value of more than 15% will be sorted out.

The advantage of testing the chip this way is that no high frequency test equipment, i.e., for test in the range of several GHz, is required because the ring oscillation is in the range of several MHz, only, but that the test nonetheless gives an exact measure for the high frequency properties of the chip.

The CDR is a clock recovery circuit and a decider circuit clocked by the recovered clock. The clock recovery circuit is realized with a phase-locked loop (PLL). The PLL has a voltage-controlled oscillator, a loop filter, and a phase detector. The phase detector compares the phase of a recovered clock signal with the phase of the input signal and generates an error signal, which corresponds to the phase difference between the two. The loop filter generates two control signals from the error signal. It has a first loop that generates the first control signal, which serves to adjust the oscillator to dynamical phase shifts in the input signal and a second control loop, which generates the second control signal that adjusts the oscillator to long-term variations in the phase of input signal. The first loop is designed as an analogue circuit, while the second control loop is designed as a digital circuit.

Details of the phase-locked loop and the associated control circuitry, that detects when the PLL has locked, is disclosed in co-pending European patent applications entitled "Phasenregelkreis, Übertragungstechnische Einheit, Erkennungsschaltung und Digital-Analog-Konverter", "Erkennungsschaltung, Phasenregelkreis, Übertragungstechnische Einheit und Digital-Analog-Konverter", and "Digital-Analog-Konverter, Phasenregelkreis, Übertragungstechnische Einheit und Erkennungsschaltung" by the same inventor and filed the same day as the present application, which contents is incorporated by reference herein.

The switch 4 in FIG. 1 is build of basic switch circuits of the type described in co-pending European patent application entitled "Basic Switching Circuit" by the same inventor and filed the same day as the present invention, which contents is incorporated by reference herein.

The signal regenerator according to the invention is designed for use in network elements of optical transmission networks, where the internal signal processing is performed electrically. In particular, such network elements have internal electrical signal paths and these paths are terminated by electrical signals regenerators as described above.

Preferably, signal regenerator of the above type are used in an optical switch. An optical switch is a device for establishing cross-connections in an optical transport network and is therefore commonly also referred to as optical crossconnect. Internally, such optical switches typically operate electrically. Therefore, a number of internal signals must be distributed electrically and are thus subject to distortion. Therefore, at the end of each internal signal path, a regenerator as described above is located.

In a preferred embodiment, the optical switch has a bitrate-transparent, asynchronous switching matrix. The matrix is constructed of a number of individual switch modules. Each switch module is a basic square matrix with a switching capacity of 32 input signals, i.e., a 32×32 space switch. Preferably, each switch module has a 33th input and output for test purposes. This allows to loop a test signal into the matrix and out of the matrix at any point in the matrix without having to change the cabling between the switch modules. The switch modules are arranged in the form of a three stage Clos matrix to form a large space switching fabric.

Figure 6:
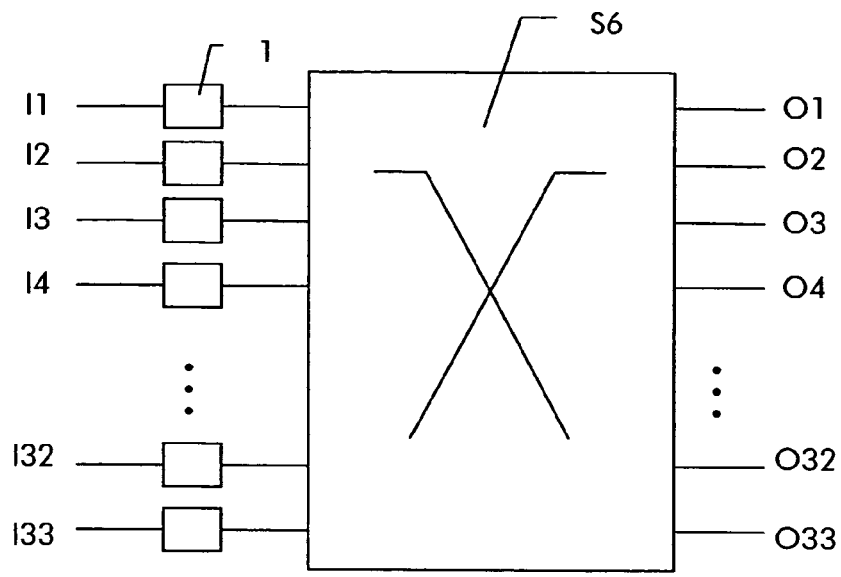
FIG. 6 shows a switch module of a network element according to the invention.

FIG. 6 shows a block diagram of one switch module S6. It comprises 33 input ports I1-I33 and 33 output ports O1-O33. Electrical signal regenerators 1 are connected to each of the input ports I1-I33 to compensate distortions in the input signals.

Figure 7:
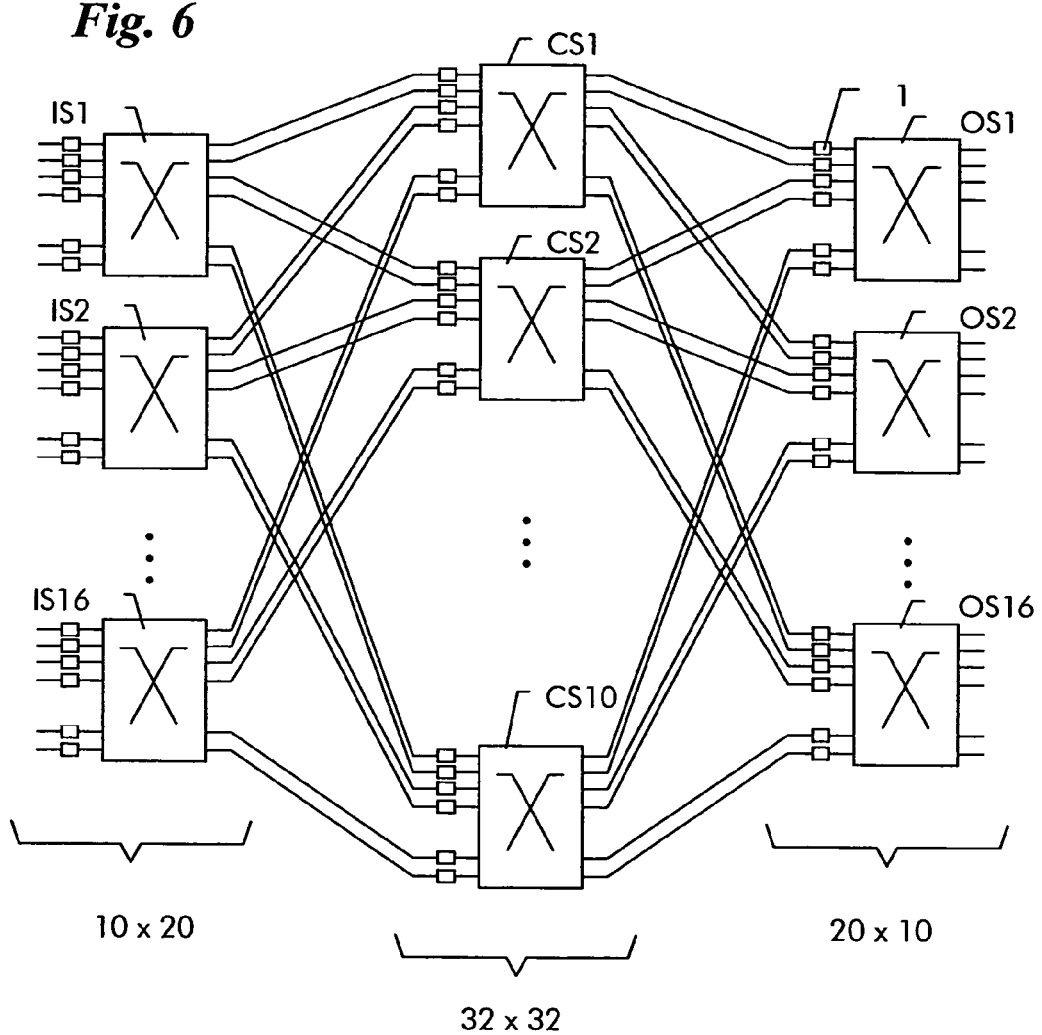
FIG. 7 shows a switching matrix used in the network element.

FIG. 7 shows how the switch modules are connected to form a three stage Clos matrix. In this arrangement, 16 switch modules form a combined input/output stage and 10 switch modules form the center stage. The switching matrix has a overall switching capacity of 160 signals. Even when in practice the input stage switches IS1-IS16 and the output stage switches OS1-OS16 are identical, for better graphical presentation they are shown isolated into output stage modules and input stage modules in the figure.

10 input ports of each input stage switch module IS1-IS16 are used as inputs for the input stage and 20 output ports of each module IS1-IS16 are used as outputs of the input stage towards the center stage. Virtually, each input stage module as shown in FIG. 7 is thus a 10×20 switch module. Two outputs of each input stage module connect to each of the center stage modules CS1-CS10. Conversely, the output stage modules OS1-OS16 shown in the figure are virtually 20×10 switch modules, i.e., have 20 input ports connected to the center stage modules and 10 output ports, each. Each center stage module is connected on its output side to two input ports of each output stage module. It can be observed, that one "virtual" input stage module (10×20) and one "virtual" output stage module (20×10) combined into one real switch module uses 30 inputs and 30 outputs thereof. The remaining two inputs and outputs are unused.

In total, the switch matrix thus contains 26 switch modules. This forms a fully non-blocking switching matrix where each input port can be connected to each output port.

The cabling between the matrix modules and between the optical receivers and transmitters and the matrix is made with coax cables. In total, 960 cables are required. In order to balance signal distortion, each cable is terminated by an electrical signal regenerator 1 as described above. Preferably, two regenerators of the above described type are combined into a single integrated circuit. This would allow to combine receive and transmit direction from and towards the same I/O port of the crossconnect within one IC.

The switch modules are preferably of the type described in co-pending European patent application entitled "Electrical Space Switching Matrix" by the same inventor and filed the same day as the present invention, which contents is incorporated by reference herein. This type of switch module allows to switch electrical signals of arbitrary bitrate of up to 12 Gbit/s. If the input signal is an OTN signal (G.709) of the lowest hierarchy level, i.e., OTU1, with a bitrate of 2.7 Gbit/s, the signals are subject to electronic equalization, only. The signal regenerators 1 automatically detect this bitrate and bypass their CDR circuits.

If the input signal is OTU2 with a bitrate of 10.7 Gbit/s, the regenerators 1 automatically select their CDR circuits for output. This arrangement has the advantage that any OTN signals (excluding here OTU3 for the reasons discussed above) can be processed irrespective of their bitrate with the some hardware and without any manual hardware configuration.

In a further advantageous improvement, the 33th signal input in each switch module is used to generate a 4 GHz frequency signal. This can easily be achieved with the switching modules described below by simply switching a loop back in the test input port of each module. This results in a ring oscillation of 4 GHz, similar to the ring oscillation described above for test purposes of the equalizer. This 4 GHz signal is used as a monitor signal and switched to any un-used output port of the module, i.e., to each output port that carries no signal at the moment. The electrical signal regenerator connected to an un-used output in front of the subsequent switch module will automatically detect the 4 GHz tone rather than a 2.7 Gbit/s signal or a 10.7 Gbit/s and would thus know that the internal cable connection is alright. Conversely, if a regenerator does not detect neither a 4 GHz tone nor a valid 1.7 or 10.7 Gbit/s signal, it concludes that an internal cable is broken or disconnected and raises a corresponding alarm. The 4 GHz tone is thus used to continuously check internal matrix cabling that carry no signals at the moment. This improves reliability of the entire optical switch.

Having described by way of non-limiting examples various embodiments of the present invention, it will be clear to those skilled in the art, that the invention is not restricted to implementation details and particular figures given in these embodiments. Conversely, those skilled in the art would appreciate that several changes, substitutions and alterations can be made without departing from the concepts and spirit of the invention.

What is claimed is:

1. An electrical signal regenerator comprising:
an equalizer;
a clock data recovery circuit;
a switch; and
a decision circuit for deciding upon a logical signal value 0 or 1,
wherein the decision circuit is connected to an output of the switch, and
wherein said switch is operable to either connect the clock data recovery circuit to an output of the electrical signal generator when an input signal of a higher bitrate multiplex signal is detected by the clock data recovery circuit, or bypass the data recovery circuit and connect the equalizer to the output of the electrical signal generator when an input signal of a lower bitrate multiplex signal is detected by the clock data recovery circuit.

2. An electrical signal regenerator according to claim 1, wherein the clock data recovery circuit comprises a detector for detecting the bitrate of the input signal.

3. An electrical signal regenerator according to claim 1, comprising a test loop controllably connectable from the output to the input of the regenerator.

4. An electrical signal regenerator according to claim 3, wherein a static test signal is fed via the test loop to an input of the equalizer while no external signal is input to the input of the equalizer.

5. An electrical signal regenerator according to claim 1, wherein said equalizer being an analogue equalizer comprising a tapped delay line.

6. An electrical signal regenerator according to claim 1, wherein said equalizer being an analogue equalizer comprising a first tap and a second tap, the first tap having a higher delay than the second tap, both taps being connected to a adder-subtractor for generating a signal corresponding to a difference between output signals of the first and second taps.

7. An electrical signal regenerator according to claim 6, wherein the signal ratio between the two taps is adjustable.

8. An electrical signal regenerator according to claim 6, wherein the signal ratio between the two taps is adjustable, and wherein the ratio is determined by two peak detectors.

9. An electrical signal regenerator according to claim 8, wherein a first detector of the two peak detectors is connected to an input of the equalizer to detect a static test input signal, and a second detector of the two peak detector is connected to an output of the first tap.

10. An electrical signal regenerator according to claim 1, wherein the higher bit rate is approximately 10 Gbit/s and the lower bit rate is approximately 2.7 Gbits/s.

11. A network element, comprising internal electrical signal paths, wherein at least part of said paths are terminated by an electrical signal regenerator comprising:
an equalizer;
a clock data recovery circuit;
a switch; and
a decision circuit for deciding upon a logical signal value 0 or 1,
wherein the decision circuit is connected to an output of the switch, and
wherein said switch is operable to either connect the data recovery circuit to an output of the electrical signal generator when an input signal of a higher bitrate multiplex signal is detected by the clock data recovery circuit, or to bypass the data recovery circuit and connect the equalizer to the output of the electrical signal generator when an input signal of a lower bitrate multiplex signal is detected by the clock data recovery circuit.

12. A network element according to claim 11 being an optical crossconnect comprising an electrical space switching matrix, said matrix comprising a number of switch modules being interconnected by means of internal electrical cables, an electrical signal regenerator is coupled to one end of each internal electrical cable in front of a switching module.

13. A network element according to claim 12, wherein said switching modules being adapted to output a test signal at each unused output port and wherein the electrical signal regenerator is adapted to raise an alarm when neither a test signal nor a valid input signal is detected.

14. A method of transmitting an electrical signal having either a first or a second bitrate, wherein the first bitrate is higher than the second bitrate, said method comprising the steps of
transmitting said electrical signal via a signal path;
detecting the bitrate of said electrical signal received from the signal path;
in the case the electrical signal has the first bitrate, performing a first regeneration of said electrical signal and then performing a second regeneration;
in the case the signal has the second bitrate, performing said first regeneration of said signal, only, wherein the detecting the bitrate of said electrical signal is performed by a unit performing the second regeneration; and
deciding upon a logical signal value 0 or 1 with respect to an output of said first regeneration and second regeneration, and an output of said first regeneration of said signal only.

15. A method according to claim 14, wherein said first signal regeneration is an electrical equalization and wherein said second signal regeneration is a clock data recovery.

* * * * *